United States Patent
Teal et al.

(10) Patent No.: US 8,162,337 B2
(45) Date of Patent: Apr. 24, 2012

(54) ADJUSTABLE CRANK ARMS FOR ELLIPTICAL BIKE AND METHOD OF USE

(75) Inventors: Brent C. Teal, Solana Beach, CA (US); Bryan L. Pate, Atherton, CA (US)

(73) Assignee: PT Motion Works, Inc., Solana Beach, CA (US)

( * ) Notice: Subject to any disclaimer, the term of this patent is extended or adjusted under 35 U.S.C. 154(b) by 0 days.

(21) Appl. No.: 12/781,066

(22) Filed: May 17, 2010

(65) Prior Publication Data

US 2010/0298101 A1    Nov. 25, 2010

Related U.S. Application Data

(60) Provisional application No. 61/179,638, filed on May 19, 2009.

(51) Int. Cl.
*B62M 1/00* (2010.01)
(52) U.S. Cl. ....................................................... 280/221
(58) Field of Classification Search .................. 280/221, 280/232
See application file for complete search history.

(56) References Cited

U.S. PATENT DOCUMENTS

| | | |
|---|---|---|
| 1,190,089 A | 7/1916 | Bellairs |
| 1,601,249 A | 9/1926 | Hayden |
| 1,617,357 A | 2/1927 | Walter |
| 1,750,187 A | 3/1930 | Miller et al. |
| 2,424,639 A | 7/1947 | Sobiral |
| 2,466,105 A | 4/1949 | Hoffman |
| 2,723,131 A | 11/1955 | McChesney, Jr. |
| 4,026,571 A | 5/1977 | Vereyken |
| 4,077,648 A | 3/1978 | Seul |
| 4,193,324 A | 3/1980 | Marc |
| 4,379,566 A | 4/1983 | Titcomb |
| 4,456,276 A | 6/1984 | Bortolin |
| 4,577,879 A | 3/1986 | Vereyken |
| 4,666,173 A * | 5/1987 | Graham ........................ 280/255 |
| 4,761,014 A | 8/1988 | Huang |
| 4,850,245 A * | 7/1989 | Feamster et al. ............. 74/594.1 |
| 4,973,046 A | 11/1990 | Maxwell |
| 5,110,148 A | 5/1992 | Stienbarger |
| 5,161,430 A | 11/1992 | Fabey |
| 5,192,089 A | 3/1993 | Taylor |
| 5,224,724 A | 7/1993 | Greenwood |
| 5,261,294 A | 11/1993 | Ticer et al. |
| 5,352,169 A | 10/1994 | Eschenbach |
| 5,368,321 A | 11/1994 | Berman et al. |

(Continued)

FOREIGN PATENT DOCUMENTS

CA    2434373    8/1996

(Continued)

*Primary Examiner* — Tashiana Adams
(74) *Attorney, Agent, or Firm* — Stephen C. Beuerle; Procopio Cory Hargreaves & Savitch LLP

(57) ABSTRACT

An apparatus including a frame with a pivot axis defined thereupon; a drive wheel coupled to the frame; a first and a second foot link operably coupled to drive wheel to transfer power to the drive wheel so as to propel the apparatus, each including a foot receiving portion for receiving an operator's foot, a front end, and a rear end; and an adjustable stride length mechanism coupling the rear end of the foot link to the pivot axis at a radial length, the adjustable stride length mechanism including a plurality of attachment points for adjusting the radial length.

16 Claims, 3 Drawing Sheets

U.S. PATENT DOCUMENTS

| | | | |
|---|---|---|---|
| 5,383,829 A | 1/1995 | Miller | |
| 5,419,572 A | 5/1995 | Stiller et al. | |
| 5,433,680 A | 7/1995 | Knudsen | |
| 5,458,022 A | 10/1995 | Mattfeld | |
| 5,527,246 A | 6/1996 | Rodgers, Jr. | |
| 5,566,589 A * | 10/1996 | Buck | 74/594.1 |
| 5,566,590 A | 10/1996 | Wan | |
| 5,591,107 A | 1/1997 | Dwyer | |
| 5,611,757 A | 3/1997 | Rodgers, Jr. | |
| 5,879,017 A | 3/1999 | Debruin | |
| 5,893,820 A | 4/1999 | Maresh et al. | |
| 6,024,676 A | 2/2000 | Eschenbach | |
| 6,077,198 A | 6/2000 | Eschenbach | |
| 6,146,313 A | 11/2000 | Whan-Tong et al. | |
| 6,270,102 B1 | 8/2001 | Fan | |
| 6,398,244 B1 | 6/2002 | Chueh | |
| 6,398,695 B2 | 6/2002 | Miller | |
| 6,439,590 B1 | 8/2002 | Liang | |
| 6,474,193 B1 | 11/2002 | Farney | |
| 6,485,041 B1 | 11/2002 | Janssen | |
| 6,572,128 B2 | 6/2003 | Graf | |
| 6,589,139 B1 | 7/2003 | Butterworth | |
| 6,640,662 B1 | 11/2003 | Baxter | |
| 6,648,353 B1 * | 11/2003 | Cabal | 280/221 |
| 6,648,355 B2 | 11/2003 | Ridenhour | |
| 6,659,486 B2 | 12/2003 | Eschenbach | |
| 6,663,127 B2 * | 12/2003 | Miller | 280/256 |
| 6,688,624 B2 | 2/2004 | Christensen et al. | |
| 6,689,019 B2 | 2/2004 | Ohrt et al. | |
| 6,715,779 B2 | 4/2004 | Eschenbach | |
| 6,726,600 B2 | 4/2004 | Miller | |
| 6,773,022 B2 * | 8/2004 | Janssen | 280/221 |
| 6,857,648 B2 | 2/2005 | Mehmet | |
| 6,895,834 B1 | 5/2005 | Baatz | |
| D526,250 S | 8/2006 | Trumble et al. | |
| 7,140,626 B1 * | 11/2006 | Keay | 280/230 |
| 7,244,217 B2 | 7/2007 | Rodgers, Jr. | |
| 7,448,986 B1 | 11/2008 | Porth | |
| 7,686,114 B2 | 3/2010 | Kim | |
| 7,717,446 B2 | 5/2010 | Pate | |
| 2002/0151412 A1 | 10/2002 | Lee | |
| 2003/0025293 A1 | 2/2003 | Drew | |
| 2003/0193158 A1 * | 10/2003 | Hung | 280/221 |
| 2005/0248117 A1 | 11/2005 | Hung | |
| 2007/0024019 A1 | 2/2007 | Tarlow | |
| 2007/0114749 A1 | 5/2007 | Tal | |
| 2007/0235974 A1 | 10/2007 | Javier | |
| 2008/0116655 A1 * | 5/2008 | Pate et al. | 280/221 |

FOREIGN PATENT DOCUMENTS

| | | |
|---|---|---|
| CA | 2670278 A1 | 11/2007 |
| KR | 20-0418734 Y1 | 6/2006 |
| KR | 10-2009-0043621 A | 5/2009 |
| WO | 03022670 | 3/2003 |

* cited by examiner

US 8,162,337 B2

ADJUSTABLE CRANK ARMS FOR ELLIPTICAL BIKE AND METHOD OF USE

CROSS-REFERENCE TO RELATED APPLICATIONS

This application claims priority to U.S. provisional patent application 61/179,638 filed on May 19, 2009 under 35 U.S.C. 119(e). U.S. provisional patent application 61/179,638 is hereby incorporated by reference as though set forth in full.

BACKGROUND

1. Field of the Invention

The present invention relates generally to elliptical bikes, and particularly to cranks arms for elliptical bikes.

2. Related Art

U.S. Published Application 2008/0116655, which is incorporated herein by reference, discloses a self-propelled vehicle propelled by an elliptical drive train (hereinafter referred to as "elliptical bicycle"). One of the challenges of elliptical bicycle design is how to effectively accommodate riders of differing body dimensions on the same elliptical bicycle frame. Because some riders prefer longer stride lengths while others prefer shorter stride lengths, without the ability to adjust the stride length on a given elliptical bicycle, a single frame could not provide an enjoyable and comfortable experience for the widest variety of users. Instead, multiple frame or crank arm sizes would be needed, adding cost and complexity to the manufacturing and distribution processes while reducing the functionality (and therefore the value) of each elliptical bicycle.

SUMMARY

An aspect of the invention involves an adjustable stride length mechanism including left and right crank adjustable arms that are mated to a bearing which is coupled to the frame of an elliptical bicycle. Each crank arm has a series of possible attachment points for coupling a foot link. By changing the actual attachment point that is coupled to the foot link, the distance from the centerline of the crank arm bearing to the coupled point on the foot link changes. Modifying this distance changes the elliptical path through which an operator's foot will travel when propelling the elliptical bicycle. The most significant change is the "stride length" (the length of the long axis of the ellipse). In an embodiment of the present invention, the effective length of the crank arm varies while the end-to-end length stays fixed; what is adjustable is the distance from the centerline of the crank arm bearing to the actual attachment point for the foot links. The attachment mechanism for selectively adjusting the distance from the centerline of the crank arm bearing to the actual attachment point for the foot links is robust and, therefore, unlikely to loosen up during use. Because each crank arm is essentially a single-piece crank arm, it is relatively light-weight and inexpensive to manufacture.

The present invention has several advantages. A reduction in the number of parts makes the adjustable stride length mechanism more manufacturable and cheaper to produce. The adjustable stride length mechanism is simpler and easier for the user to repeatably set one's stride length to the same distance if it has been adjusted. The adjustable crank arms of the adjustable stride length mechanism are less likely to loosen up during riding because the attachment mechanism is more robust and more proven. Finally, the adjustable crank arms are more space efficient and lighter than previous designs.

Another aspect of the invention involves an apparatus including a frame with a pivot axis defined thereupon; a drive wheel coupled to the frame; a first and a second foot link operably coupled to drive wheel to transfer power to said drive wheel so as to propel the apparatus, each including a foot receiving portion for receiving an operator's foot, a front end, and a rear end; and an adjustable stride length mechanism coupling the rear end of the foot link to the pivot axis at a radial length, the adjustable stride length mechanism including a plurality of attachment points for adjusting the radial length.

An additional aspect of the invention involves a frame having a drive wheel rotatably supported thereupon, and a pivot axis defined thereupon; a first and a second foot link, each having a first end, a second end, and a foot receiving portion defined thereupon; a coupler assembly which is in mechanical communication with said pivot axis and with a first end of each of said first and second foot links, said coupler assembly including an adjustable stride length mechanism including a plurality of attachment points and being operative to direct said first ends of said foot links in an arcuate path of travel; a foot link guide supported by said frame, said guide being operable to engage a second end of each of said foot links, and to direct said second ends along a reciprocating path of travel; and a power transfer linkage in mechanical communication with said coupler assembly and with said drive wheel; whereby when the first end of one of said foot links travels in said arcuate path and the second end of that foot link travels in said reciprocal path, an operator's foot supported thereupon travels in a generally elliptical path of travel with a stride length that is determined by the selected attachment point for the foot link onto the adjustable stride length mechanism, and said power transfer linkage transfers power from said coupler assembly to said drive wheel, so as to supply propulsive power thereto.

A further aspect of the invention involves an apparatus including a frame having a drive wheel rotatably supported thereupon, and a pivot axis defined thereupon; a first and a second foot link, each having a first end, a second end, and a foot receiving portion defined thereupon; a coupler assembly which is in mechanical communication with said pivot axis and with a first end of each of said first and second foot links, said coupler assembly including an adjustable stride length mechanism including a plurality of attachment points and being operative to direct said first ends of said foot links in an arcuate path of travel; a foot link guide track supported by said frame, said foot link guide track being operable to engage a second end of each of said foot links, and to direct said second ends along a reciprocating path of travel; and a power transfer linkage in mechanical communication with said coupler assembly and with said drive wheel; whereby when the first end of one of said foot links travels in said arcuate path and the second end of that foot link travels in said reciprocal path, an operator's foot supported thereupon travels in a generally elliptical path of travel with a stride length that is determined by the selected attachment point for the foot link onto the adjustable stride length mechanism, and said power transfer linkage transfers power from said coupler assembly to said drive wheel, so as to supply propulsive power thereto.

A still further aspect of the invention involves an apparatus including a frame having a drive wheel rotatably supported thereupon, and a pivot axis defined thereupon; a first and a second foot link, each having a first end, a second end, and a foot receiving portion defined thereupon; a coupler assembly which is in mechanical communication with said pivot axis and with a first end of each of said first and second foot links, said coupler assembly including an adjustable stride length mechanism including a plurality of attachment points and being operative to direct said first ends of said foot links in an arcuate path of travel; a first and a second swing arm supported by said frame, said first and second swing arm operable to engage a second end of each respective foot link, and to direct said second ends along a reciprocating path of travel; and a power transfer linkage in mechanical communication with said coupler assembly and with said drive wheel; whereby when the first end of one of said foot links travels in said arcuate path and the second end of that foot link travels in said reciprocal path, an operator's foot supported thereupon travels in a generally elliptical path of travel with a stride length that is determined by the selected attachment point for the foot link onto the adjustable stride length mechanism, and said power transfer linkage transfers power from said coupler assembly to said drive wheel, so as to supply propulsive power thereto.

Another aspect of the invention involves an apparatus including a frame with a crank arm bearing including a centerline and a pivot axis defined thereupon; a steering mechanism coupled to the frame; a front wheel and a rear wheel coupled to the frame, the rear wheel including a rear wheel axle coupled to the pivot axis; a first and a second foot link, each including a foot receiving portion for receiving an operator's foot, a front end, and a rear end; an adjustable stride length mechanism coupled to the pivot axis and including a plurality of attachment points; and an attachment mechanism for selectively attaching the rear end of the foot link to one of the plurality of attachment points of the adjustable stride length mechanism at a coupled point for selectively adjusting a distance from the centerline of the crank arm bearing to the coupled point to adjust an elliptical path through which the user's foot will travel when propelling the apparatus.

One or more implementations of the aspects of the invention described above include one or more of the following: an attachment mechanism for selectively attaching the rear end of the foot link to one of the plurality of attachment points of the adjustable stride length mechanism; an attachment mechanism for selectively attaching the pivot axis to one of the plurality of attachment points of the adjustable stride length mechanism; and/or the foot receiving portion travels in an elliptical path and said adjustable stride length mechanism is operable for varying the elliptical path in which the foot receiving portion travels.

Other features and advantages of the present invention will become more readily apparent to those of ordinary skill in the art after reviewing the following detailed description and accompanying drawings.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

Figure 1:
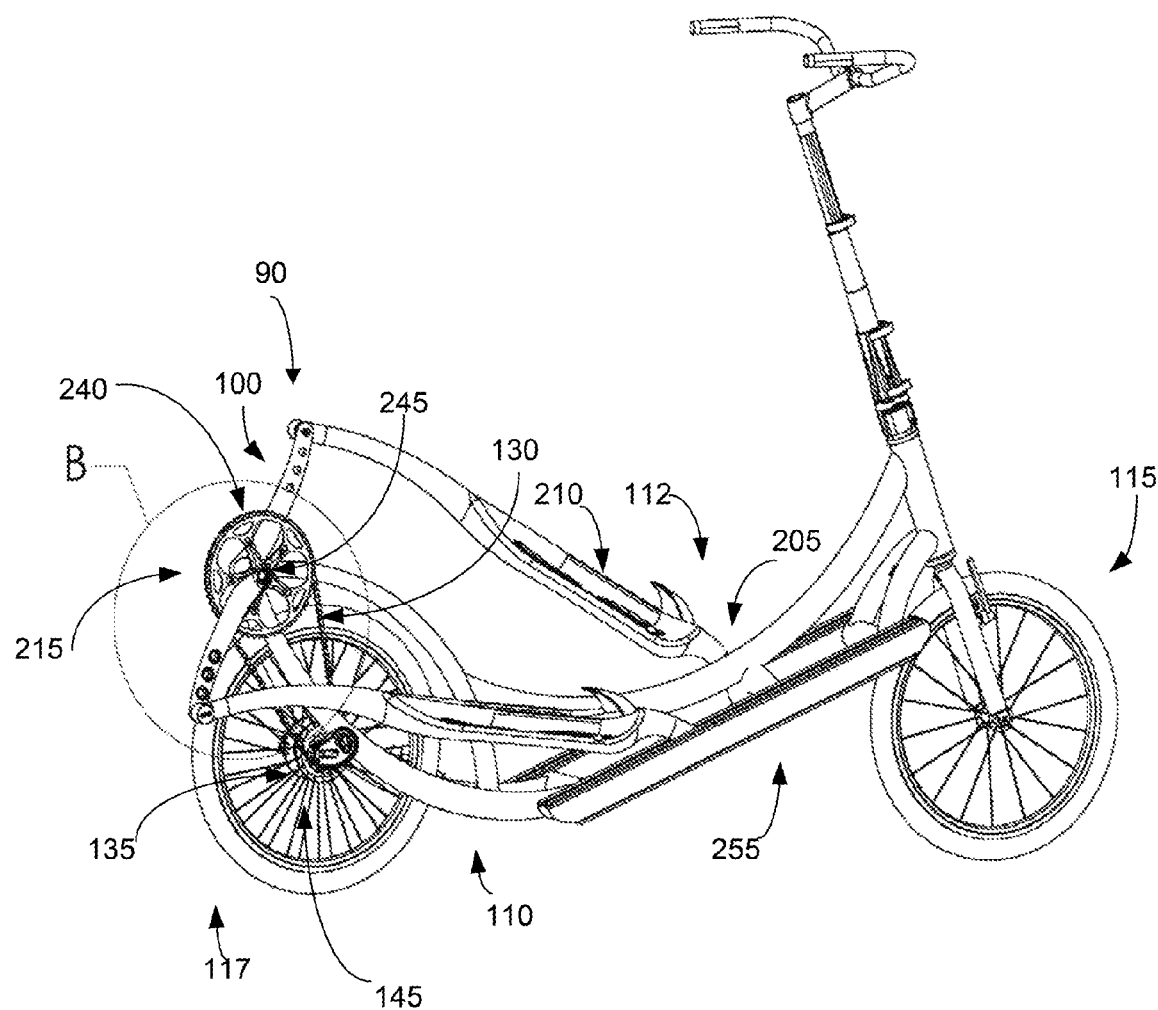
FIG. 1 is a front-elevational view of an embodiment of an elliptical bicycle including an adjustable stride length mechanism with adjustable crank arms constructed in accordance with an embodiment of the invention.
Figure 2:
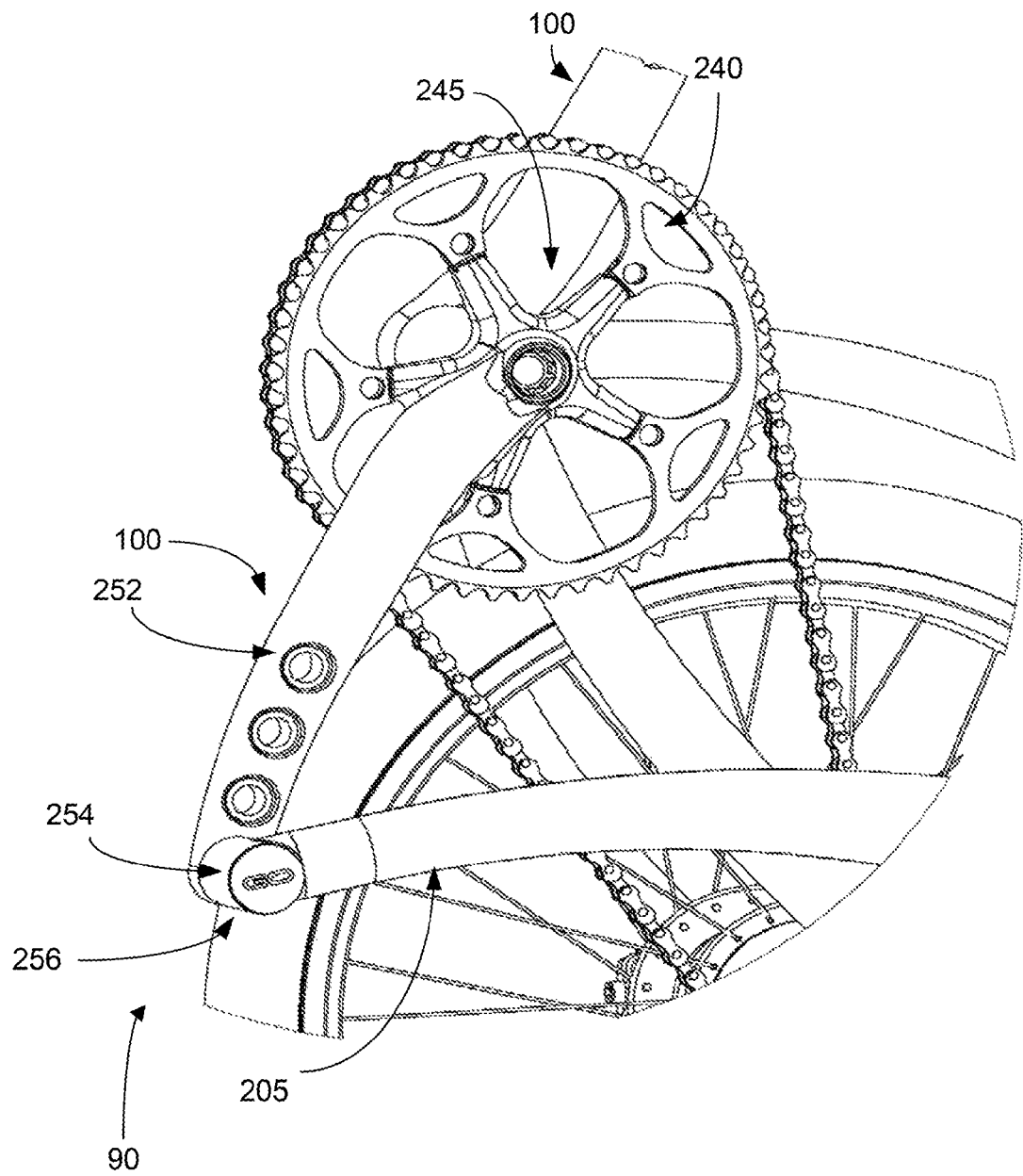
FIG. 2 is an enlarged front-elevational view taken along area B of FIG. 1 and shows the adjustable stride length mechanism with adjustable crank arms.

With reference to FIGS. 1 and 2, an embodiment of an adjustable stride length mechanism 90 including adjustable crank arms 100 of an elliptical bicycle 110 is shown. Before describing the adjustable stride length mechanism 90, the elliptical bicycle 110 will first be described. In alternative embodiments, the adjustable stride length mechanism 90 is applied to elliptical tricycles, other types of elliptical vehicles, and/or other types of elliptical bicycles. The embodiment of the elliptical bicycle 110 shown and described herein includes a slider-crank mechanism for generating elliptical motion. In an alternative embodiment, which is shown and described with respect to FIG. 1 in U.S. Pat. No. 6,663,127 to Miller, which is incorporated by reference herein, the elliptical bicycle 110 includes a four-bar mechanism for generating elliptical motion. Both the slider-crank mechanism and the four-bar mechanism use an adjustable stride length mechanism 90 to generate a circular motion at one end of the foot link. The difference is at the other end, the slider-crank mechanism uses a linear track with rollers (or some other sliding interface) to generate linear motion and the four-bar mechanism uses a pair of swing arms to generate linear motion.

The elliptical bicycle 110 includes a foot link assembly 112 movably mounted on a frame, or frame structure 114, on which one or more wheels (front wheel 115, rear wheel 117) are mounted. Generally, each foot link assembly 112 is movably mounted to the frame 114 at its forward end where it is slidably coupled to a foot link guide track 255 and at its rearward end where it is rotatably coupled to a crank assembly 215.

Generally, each foot link assembly 112 includes a foot link 205, each with a foot platform 210, and a foot link coupler (not shown). The foot platforms 210 on which the operator stands are mounted on an upper surface of each foot link 205 near a forward end of each foot link 205. Towards the forward end of each foot link is a foot link coupler (not shown) that contacts the foot link guide track 255. In the embodiment depicted in FIG. 1, two foot link guide tracks 255 run parallel to each other on either side of the longitudinal axis of the elliptical bicycle 110 and are coupled to or integral with the frame 114. Each foot link coupler (not shown) can be comprised of two load wheels which are mounted to fixed axles and allow nearly frictionless linear motion of the foot links 205 along the foot link guide tracks 255. In alternative embodiments, for example, but not by way of limitation, other numbers of foot link guide tracks 255 are provided, other numbers of load wheels are provided, other types of foot link guide tracks 255 are provided, other types of foot link couplers are provided, or the slider-crank mechanism can be replaced by the four-bar mechanism described above.

At the rear of the elliptical bicycle 110, adjacent the rear wheel 117, are an adjustable stride length mechanism 90 including adjustable crank arms 100, a drive sprocket 240, a crank arm bearing 245, a chain 130, a rear wheel sprocket 135, and a rear wheel hub 145.

During pedaling, the operator (not shown) uses his mass in a generally downward and rearward motion as in walking or jogging to exert a force on the foot platforms 210 and thereby, the foot links 205. This force causes the load wheels to roll along the foot link guide track 255 towards the rear of the elliptical bicycle 110 and rotate the crank arms 100 about the crank arm bearing 245, turning the drive sprocket 240. As with conventional bicycles, rotating the drive sprocket 240 causes the rear wheel sprocket 135 to rotate because they are linked by the chain 130. It will be appreciated that in other embodiments, the chain 130 may be replaced by a belt, rotating shaft or other drive means, or the chain, drive sprocket 240 and rear wheel sprocket 135 may be eliminated entirely by coupling the adjustable crank arms 100 of the adjustable stride length mechanism 90 to the rear wheel hub 145. In this embodiment, rotating the rear wheel sprocket 135 causes the rear wheel 117 to rotate because the rear wheel sprocket 135 is attached to rear wheel hub 145. Rotating the rear wheel 117 provides motive force that enables the elliptical bicycle 110 to move along a surface. The elliptical bicycle 110 can employ a "fixed" or "free" rear wheel, as is known in the art. The elliptical bicycle 110 can also employ a planetary gear hub or derailleur system having different gear ratios, as is known in the art.

Pedaling the elliptical bicycle 110 as described above results in the operator's foot traveling in a shape that can be described as generally elliptical. Propulsion using an elliptical pedaling motion, as opposed to an up-and-down pedaling motion or a circular pedaling motion, has the advantage of substantially emulating a natural human running or walking motion. Further, an elliptical pedaling motion is a simpler and a more efficient means to rotate the rear wheel 117 than is, for example, a vertical pumping motion. Moreover, the major axis of the ellipse in an elliptical pedaling motion can be much longer than the stroke length of a circular or vertical pumping pedaling motion, allowing the operator to employ a larger number of muscle groups over a longer range of motion during the pedal stroke than he or she could employ in a circular or up and down pedaling motion.

Figure 3:
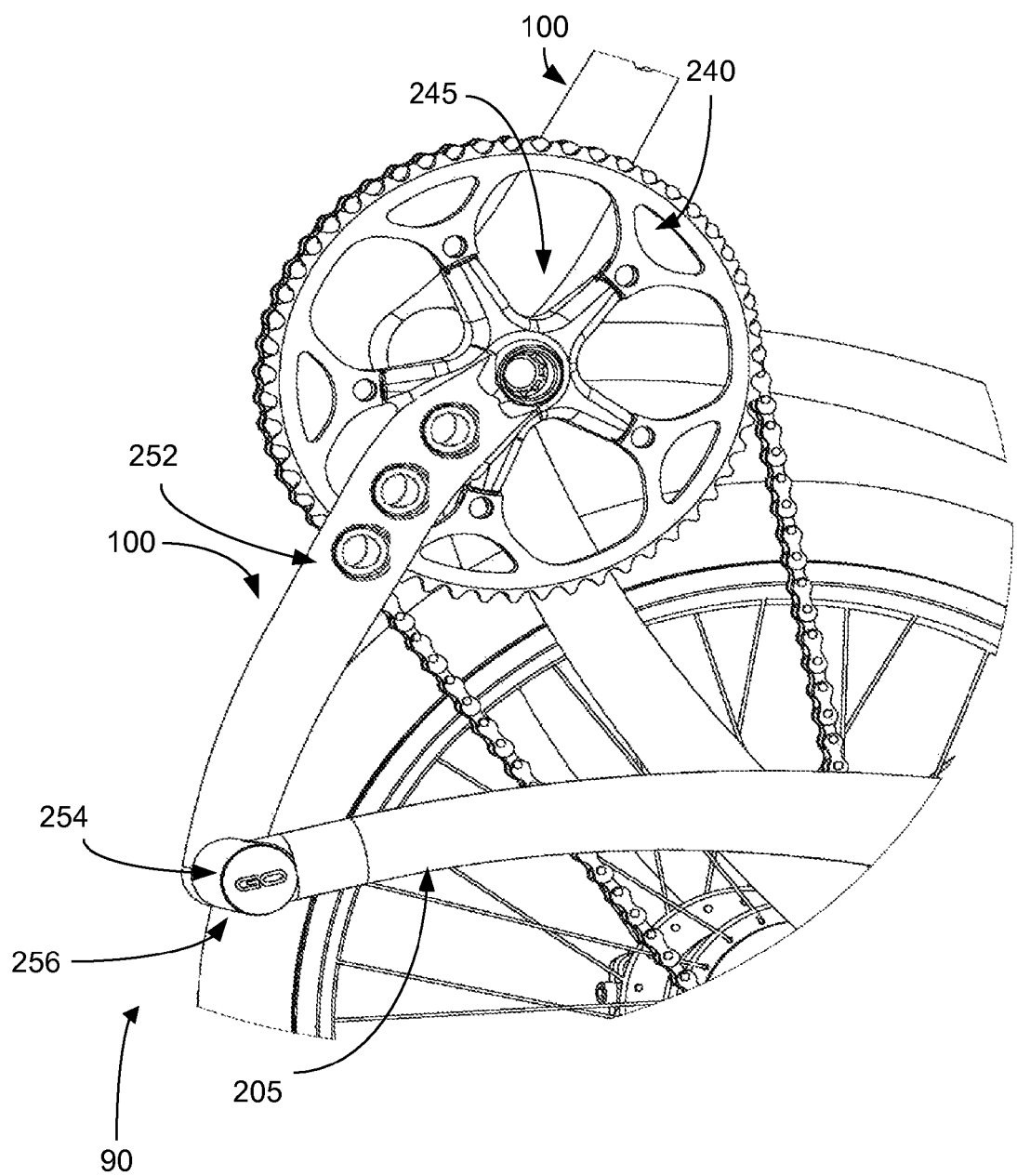
FIG. 3 is an enlarged front-elevational view of another embodiment of an adjustable stride length mechanism with adjustable crank arms.

The adjustable stride length mechanism 90 will now be described in more detail. The adjustable stride length mechanism 90 includes adjustable crank arms 100 mated to the crank arm bearing 245, which is coupled to the frame 114 of the elliptical bicycle 110, to turn drive sprocket 240. Each crank arm 100 can have a plurality of discrete attachment points 252 for coupling the foot link 205, or the foot link attachment mechanism 256 can enable the foot links 205 to be attached at any point (e.g., of infinite points) on the crank arm 100, if, for example, there are not discrete attachment points (e.g., foot link 205 is clamped to any point on the crank arm 100). Thus, when referring to "plurality of attachment points" herein, this can refer to more than one discrete attachment point or more than one of the infinite number of possible attachment points in an embodiment where there are not discrete attachment points. In an alternative embodiment, as shown in FIG. 3, the attachments points 252 are located near an opposite end of the crank arm 100 for changing the attachment point 252 that is coupled to the crank arm bearing 245. Again, these could be discrete attachment points, or the attachment mechanism in this embodiment could allow coupling at any point (e.g., of infinite points) on the crank arm.

By changing the attachment point 252 that is coupled to the foot link 205, the distance from the centerline of the crank arm bearing 245 to an actual attachment point 254 on the foot link 205 changes. Modifying this distance changes the elliptical path through which an operator's foot will travel when propelling the elliptical bicycle 110. The most significant change is the "stride length" which is the length of the long axis of the ellipse. Although the crank arm 100 is referred to as "adjustable", it should be noted that in the embodiments shown the length of the crank arm 100 stays fixed; what is adjustable is the distance from the centerline of the crank arm bearing 245 to the actual attachment point 254 for the foot links 205. Thus, the effective length of the crank arm 100 varies while the end-to-end length of the crank arm 100 stays fixed. An attachment mechanism 256 (e.g., threaded spindle, pin, clamp, bracket, threaded fastener) for selectively adjusting the distance from the centerline of the crank arm bearing 245 to the actual attachment point 254 for the foot links 205 is robust and, therefore, unlikely to loosen up during use. Because each crank arm 100 is essentially a single-piece crank arm, it is relatively light-weight and inexpensive to manufacture.

When compared to previous designs, the reduction in the number of parts makes the adjustable stride length mechanism 90 more manufacturable and cheaper to produce. The adjustable stride length mechanism 90 is also simpler and easier for the user to repeatably set one's stride length to the same distance if it has been adjusted. The adjustable crank arms 100 are less likely to loosen up during riding because the attachment mechanism 256 is more robust and more proven. The adjustable crank arms 100 are also more space efficient and lighter weight than previous designs.

The above figures may depict exemplary configurations for the invention, which is done to aid in understanding the features and functionality that can be included in the invention. The invention is not restricted to the illustrated architectures or configurations, but can be implemented using a variety of alternative architectures and configurations. Additionally, although the invention is described above in terms of various exemplary embodiments and implementations, it should be understood that the various features and functionality described in one or more of the individual embodiments with which they are described, but instead can be applied, alone or in some combination, to one or more of the other embodiments of the invention, whether or not such embodiments are described and whether or not such features are presented as being a part of a described embodiment. Thus the breadth and scope of the present invention, especially in any following claims, should not be limited by any of the above-described exemplary embodiments.

Terms and phrases used in this document, and variations thereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

We claim:

1. An apparatus, comprising:
    a frame with a pivot axis defined thereupon;
    a drive wheel coupled to the frame;
    a first and a second foot link operably coupled to drive wheel to transfer power to said drive wheel so as to propel the apparatus, each including a foot receiving portion for receiving an operator's foot, a front end, and a rear end;
    an adjustable stride length mechanism coupling the rear end of the foot link to the pivot axis at a radial length, the adjustable stride length mechanism including a plurality of attachment points for adjusting the radial length; and
    an attachment mechanism for selectively attaching the pivot axis to one of the plurality of attachment points of the adjustable stride length mechanism.

2. The apparatus of claim 1, further including an attachment mechanism for selectively attaching the rear end of the foot link to one of the plurality of attachment points of the adjustable stride length mechanism.

3. The apparatus of claim 1, wherein the foot receiving portion travels in an elliptical path and the adjustable stride length mechanism is operable for varying the elliptical path in which the foot receiving portion travels.

4. An apparatus, comprising:
    a frame having a drive wheel rotatably supported thereupon, and a pivot axis defined thereupon;
    a first and a second foot link, each having a first end, a second end, and a foot receiving portion defined thereupon;
    a coupler assembly which is in mechanical communication with said pivot axis and with a first end of each of said first and second foot links, said coupler assembly including an adjustable stride length mechanism including a plurality of attachment points and being operative to direct said first ends of said foot links in an arcuate path of travel;
    a foot link guide supported by said frame, said guide being operable to engage a second end of each of said foot links, and to direct said second ends along a reciprocating path of travel;
    a power transfer linkage in mechanical communication with said coupler assembly and with said drive wheel; whereby when the first end of one of said foot links travels in said arcuate path and the second end of that foot link travels in said reciprocal path, an operator's foot supported thereupon travels in a generally elliptical path of travel with a stride length that is determined by the selected attachment point for the foot link onto the adjustable stride length mechanism, and said power transfer linkage transfers power from said coupler assembly to said drive wheel, so as to supply propulsive power thereto.

5. The apparatus of claim 4, further including an attachment mechanism for selectively attaching the rear end of the foot link to one of the plurality of attachment points of the adjustable stride length mechanism.

6. The apparatus of claim 4, further including an attachment mechanism for selectively attaching the pivot axis to one of the plurality of attachment points of the adjustable stride length mechanism.

7. The apparatus of claim 4, wherein the adjustable stride length mechanism is operable for varying the elliptical path through which the operator's foot travels.

8. An apparatus, comprising:
    a frame having a drive wheel rotatably supported thereupon, and a pivot axis defined thereupon;
    a first and a second foot link, each having a first end, a second end, and a foot receiving portion defined thereupon;
    a coupler assembly which is in mechanical communication with said pivot axis and with a first end of each of said first and second foot links, said coupler assembly including an adjustable stride length mechanism including a plurality of attachment points and being operative to direct said first ends of said foot links in an arcuate path of travel;
    a foot link guide track supported by said frame, said foot link guide track being operable to engage a second end of each of said foot links, and to direct said second ends along a reciprocating path of travel;
    a power transfer linkage in mechanical communication with said coupler assembly and with said drive wheel; whereby when the first end of one of said foot links travels in said arcuate path and the second end of that foot link travels in said reciprocal path, an operator's foot supported thereupon travels in a generally elliptical path of travel with a stride length that is determined by the selected attachment point for the foot link onto the adjustable stride length mechanism, and said power transfer linkage transfers power from said coupler assembly to said drive wheel, so as to supply propulsive power thereto.

9. The apparatus of claim 8, further including an attachment mechanism for selectively attaching the rear end of the foot link to one of the plurality of attachment points of the adjustable stride length mechanism.

10. The apparatus of claim 8, further including an attachment mechanism for selectively attaching the pivot axis to one of the plurality of attachment points of the adjustable stride length mechanism.

11. The apparatus of claim 8, wherein the adjustable stride length mechanism is operable for varying the elliptical path through which the operator's foot travels.

12. An apparatus, comprising:
    a frame having a drive wheel rotatably supported thereupon, and a pivot axis defined thereupon;
    a first and a second foot link, each having a first end, a second end, and a foot receiving portion defined thereupon;
    a coupler assembly which is in mechanical communication with said pivot axis and with a first end of each of said first and second foot links, said coupler assembly including an adjustable stride length mechanism including a plurality of attachment points and being operative to direct said first ends of said foot links in an arcuate path of travel;
    a first and a second swing arm supported by said frame, said first and second swing arm operable to engage a second end of each respective foot link, and to direct said second ends along a reciprocating path of travel;
    a power transfer linkage in mechanical communication with said coupler assembly and with said drive wheel; whereby when the first end of one of said foot links travels in said arcuate path and the second end of that foot link travels in said reciprocal path, an operator's foot supported thereupon travels in a generally elliptical path of travel with a stride length that is determined by the selected attachment point for the foot link onto the adjustable stride length mechanism, and said power transfer linkage transfers power from said coupler assembly to said drive wheel, so as to supply propulsive power thereto.

13. The apparatus of claim 12, further including an attachment mechanism for selectively attaching the rear end of the foot link to one of the plurality of attachment points of the adjustable stride length mechanism.

14. The apparatus of claim 12, further including an attachment mechanism for selectively attaching the pivot axis to one of the plurality of attachment points of the adjustable stride length mechanism.

15. The apparatus of claim 12, wherein the adjustable stride length mechanism is operable for varying the elliptical path through which the operator's foot travels.

16. An apparatus, comprising a frame with a crank arm bearing including a centerline and a pivot axis defined thereupon;

a steering mechanism coupled to the frame;

a front wheel and a rear wheel coupled to the frame, the rear wheel including a rear wheel axle coupled to the pivot axis;

a first and a second foot link, each including a foot receiving portion for receiving an operator's foot, a front end, and a rear end;

an adjustable stride length mechanism coupled to the pivot axis and including a plurality of attachment points; and an attachment mechanism for selectively attaching the rear end of the foot link to one of the plurality of attachment points of the adjustable stride length mechanism at a coupled point for selectively adjusting a distance from the centerline of the crank arm bearing to the coupled point to adjust an elliptical path through which the user's foot will travel when propelling the apparatus.

\* \* \* \* \*